United States Patent [19]

Morishima et al.

[11] Patent Number: 4,999,560
[45] Date of Patent: Mar. 12, 1991

[54] ELECTRIC MOTOR RUNNING SYSTEM EMPLOYING PHOTOVOLTAIC ARRAY

[75] Inventors: Yoichi Morishima; Kazuo Kobayashi; Isao Suzuki, all of Mie, Japan

[73] Assignee: Kabushiki Kaisha Toshiba, Kawasaki, Japan

[21] Appl. No.: 293,588

[22] Filed: Dec. 30, 1988

Related U.S. Application Data

[63] Continuation of Ser. No. 872,027, Jun. 9, 1986, abandoned.

[30] Foreign Application Priority Data

Jun. 11, 1985 [JP] Japan .................. 60-125028
Sep. 17, 1985 [JP] Japan .................. 60-203312
Oct. 25, 1985 [JP] Japan .................. 60-237490
Nov. 29, 1985 [JP] Japan .................. 60-267218

[51] Int. Cl.$^5$ .................. H02P 1/28; H02P 1/30
[52] U.S. Cl. .................. 318/779; 318/778; 323/906
[58] Field of Search .......... 318/778, 779; 323/906; 417/411; 136/291, 293, 248, 244

[56] References Cited

U.S. PATENT DOCUMENTS

| | | | |
|---|---|---|---|
| 3,787,724 | 1/1974 | Pedersen et al. | 318/722 |
| 3,971,972 | 7/1976 | Stich | 318/811 |
| 4,311,951 | 1/1982 | Walker et al. | 318/778 |
| 4,334,182 | 6/1982 | Landino | 318/808 |
| 4,465,961 | 8/1984 | Landino | 318/811 |
| 4,475,150 | 10/1984 | D'Atre et al. | 318/806 |
| 4,494,180 | 1/1985 | Streater et al. | 323/906 |
| 4,587,605 | 5/1986 | Kouyama | 318/811 |
| 4,620,140 | 10/1986 | Chonan | 323/906 |

OTHER PUBLICATIONS

Franx, Ir. C., "A New Approach to Solar Pump Systems Using Submersible Motors", Conference: Commission of the European Communities, 2nd E.C., Photovoltaic Solar Energy Conference, Berlin, West Germany, Apr. 23–26, 1979, pp. 1038–1046.

"Microcomputer Control of a Residential Photovoltaic Power Conditioning System", Bimal K. Bose et al., U.S. DEO Report 1984.

Primary Examiner—David Smith, Jr.
Attorney, Agent, or Firm—Foley & Lardner, Schwartz, Jeffery, Schwaab, Mack, Blumenthal & Evans

[57] ABSTRACT

An electric motor running system consists of a photovoltaic array, an inverter for inverting output voltage of the photovoltaic array to AC voltage and automatically controlled so that the frequency is changed in accordance with the output voltage of the photovoltaic array, maintaining the ratio of the voltage to the frequency at a constant value, an induction motor operated by application of the AC voltage from the inverter, and a frequency increasing circuit for increasing the output frequency of the inverter instantaneously so that the motor produces the torque larger than the load starting torque when the motor is started and further decreasing the increased output frequency of the inverter to the normal running frequency after the increased output frequency is maintained for a predetermined period of time. This construction allows the motor to be smoothly started even where a load connected to the motor is a positive displacement pump which has a large static friction torque.

7 Claims, 13 Drawing Sheets

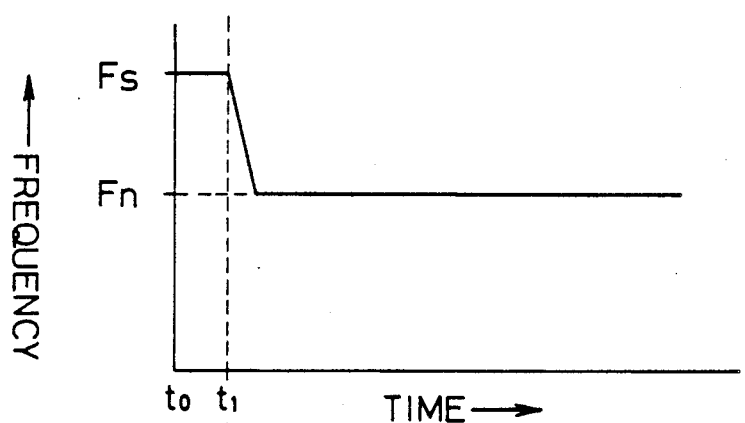
(a)
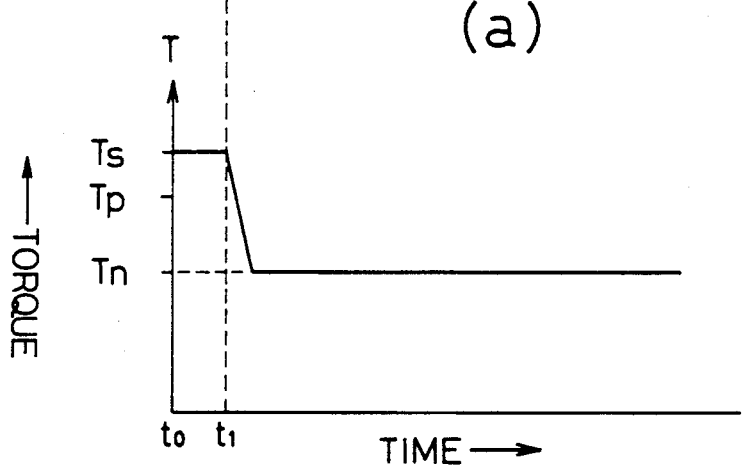
(b)
Fig.3

as shown in FIG. 14, whereby the photovoltaic array is normally used at the maximum efficiency.

According to the above-described device including the inverter, where a load connected to the electric motor has a large static friction torque as in the case of a positive displacement pump instead of a centrifugal pump or a fan, the load starting torque becomes excessively larger than the normal running torque of the motor which is attained at a normal running frequency for maintaining the voltage Vc. Consequently, in the case where the inverter is controlled during the starting of the motor so that the output frequency of the inverter is gradually increased to the value of the normal running frequency, the motor is led into the condition where it is unable to be started.

The above-described problem also arises in the case where the motor is automatically restarted after temporary stop during running due to drop of the solar insolation degree.

SUMMARY OF THE INVENTION

It is, therefore, an object of this invention to provide an improved electric motor running system employing a photovoltaic array wherein the motor can initially be started and restarted without fail even where the load starting torque exceeds the normal running torque of the motor to a large extent.

The relationship between the starting torque T and the frequency of the induction motor is usually shown by the following expression:

$$T = \frac{P}{4\pi f} \cdot \frac{3V^2}{\left(\frac{r_2^2 + X^2}{r_2} + r_2 + 2r_1\right)} \quad (1)$$

where
P = number of poles
f = running frequency of the motor
V = input voltage
$r_1$ = primary resistance
$r_2$ = secondary resistance
X = sum of primary and secondary reactances In the expression (1), the value of X depends on the frequency f but is smaller than the values of $r_1$ and $r_2$, so that the parenthesized term is considered as independent of the frequency f. Furthermore, since the torque is maintained at a constant value where the motor is running with the output power supplied through the inverter, the relationship shown by the following expression holds when the motor runs under the condition where the ratio V/f has a constant value:

$$T \approx kV \quad (2)$$

where k = constant.

The expression (2) shows that the starting torque T is increased with increase of the input voltage V, that is, with increase of the frequency f.

This invention is based upon the above-described point and is characterized in that high-level starting torque is gained by increasing the output frequency of the inverter for a predetermined short period of time in the starting of a normal running motor.

The electric motor running system of this invention comprises a photovoltaic array, an inverter which inverts the output voltage from the photovoltaic array to AC voltage having a constant ratio of the voltage to the

ELECTRIC MOTOR RUNNING SYSTEM EMPLOYING PHOTOVOLTAIC ARRAY

This application is a continuation of application Ser. No. 06/872,027, filed Jun. 9, 1986. Now abandoned.

BACKGROUND OF THE INVENTION

1. Field of the Invention

This invention relates to an electric motor running system employing a photovoltaic array wherein output voltage from the photovoltaic array is invereted to AC voltage by a frequency-controllable inverter to thereby apply the AC voltage to an induction motor, and more particularly to such a system which includes a means for providing the induction motor with starting compensation in the initial starting and/or restarting after stop during running.

2. Description of the Prior Art

In the photovoltaic array, the voltage drops to a large extent with increase of an amount of current as compared with an alkali and a lead storage batteries. In FIG. 14, the solid line shows the output voltage (V)-output current (I) characteristics of the photovoltaic array in the case where the solar insolation degree Ee at 28° C. is a parameter. The broken line denotes the output voltage (V) -output power (W) characteristics in the above-mentioned state of condition. FIG. 14 shows that the output voltage is gradually decreased to zero with increase of the amount of the output current in the photovoltaic array. On the other hand, the output voltage is increased with decrease of the amount of the output current and at last reaches an open-circuit voltage (or no-load output voltage). This shows that the photovoltaic array has wide voltage fluctuations. Accordingly, where the photovoltaic array is employed as a power source for an electric motor for driving a pump, fan or the like, a large amount of current flowing at the starting of the motor causes excessive voltage drop, which renders the starting of the motor impossible. In order to prevent this, the photovoltaic array having a larger capacity than that needed for normal running of the motor is employed. This, however, causes the photovoltaic array to become large in size, which brings about rise of the production cost.

To prevent the above-described case, the prior art has provided a device which has an inverter between the photovoltaic array and the motor. The inverter has functions to invert DC voltage to AC voltage and to control the output frequency. According to this device, the output frequency of the inverter is automatically controlled during the starting of the motor so as to be gradually increased to the normal running frequency, preventing excessive increase of the starting current so that the motor is started smoothly.

Furthermore, the inverter is controlled so that the torque of the motor may become constant in a predetermined range of rotation, maintaining a constant ratio of the output voltage to the output frequency thereof. In addition, the inverter is automatically controlled so that the output voltage of the photovoltaic array may be maintained at a predetermined value Vc, in order to prevent the output voltage of the photovoltaic array from being varied due to the load variations. In this case, the value Vc is determined so that the output power of the photovoltaic array may become maximum at the value Vc under different solar insolation degrees, frequency and in which the frequency is automatically controlled so that the output voltage of the photovoltaic array is maintained at a predetermined value, an induction motor operated by application of the AC voltage from the inverter thereto, a means for increasing the frequency, and a means for starting the induction motor. The frequency increasing means is adapted to increase the output frequency of the inverter rapidly to a value necessary for the motor torque to exceed the static friction torque of the load, that is, the starting torque when turned to the operative state and further to maintain the increased value of the output frequency of the inverter. while it is in the operative state. The starting means is automatically controlled so that the frequency increasing means is held at the operative state for a predetermined period of time in the initial starting or restarting of the motor.

The inverter is controlled so that the output frequency thereof is rapidly increased in the starting of the motor temporally and further that the output frequency is decreased to the value necessary for the normal running after the starting of the motor, so that the starting torque of the motor is increased above the normal running torque. As a result, the motor can smoothly be started without fail even where the load connected to the motor has a large static friction torque as in the positive displacement pump.

According to one embodiment of this invention, the frequency increasing means is controlled so as to be held at the operative state while the revolution of the motor is increased from zero to a predetermined value.

According to another embodiment of this invention, the electric motor running system includes a means for dectecting a locked-rotor condition when the rotor of the motor is locked due to decrease of the solar insolation degree. The frequency increasing means is temporally put into the operative state when it receives a signal supplied from the locked-rotor condition detecting means, and the motor is restarted through the inverter.

According to further another embodiment of this invention, the inverter is automatically deactivated when the output frequency is decreased to a predetermined value during running of the motor with decrease of the solar insolation degree. The inverter is activated again when the solar insolation degree is recovered to a predetermined value. In the case of reactivation of the inverter, the frequency increasing means is put into the operative state, so that the output frequency of the inverter is temporally increased in restarting of the motor.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

In the accompanying drawings:

FIG. 3 is a graph showing the changes of the output frequency of the inverter and the torque of the electric motor for the lapse of time;

DESCRIPTION OF PREFERRED EMBODIMENTS

Figure 1:
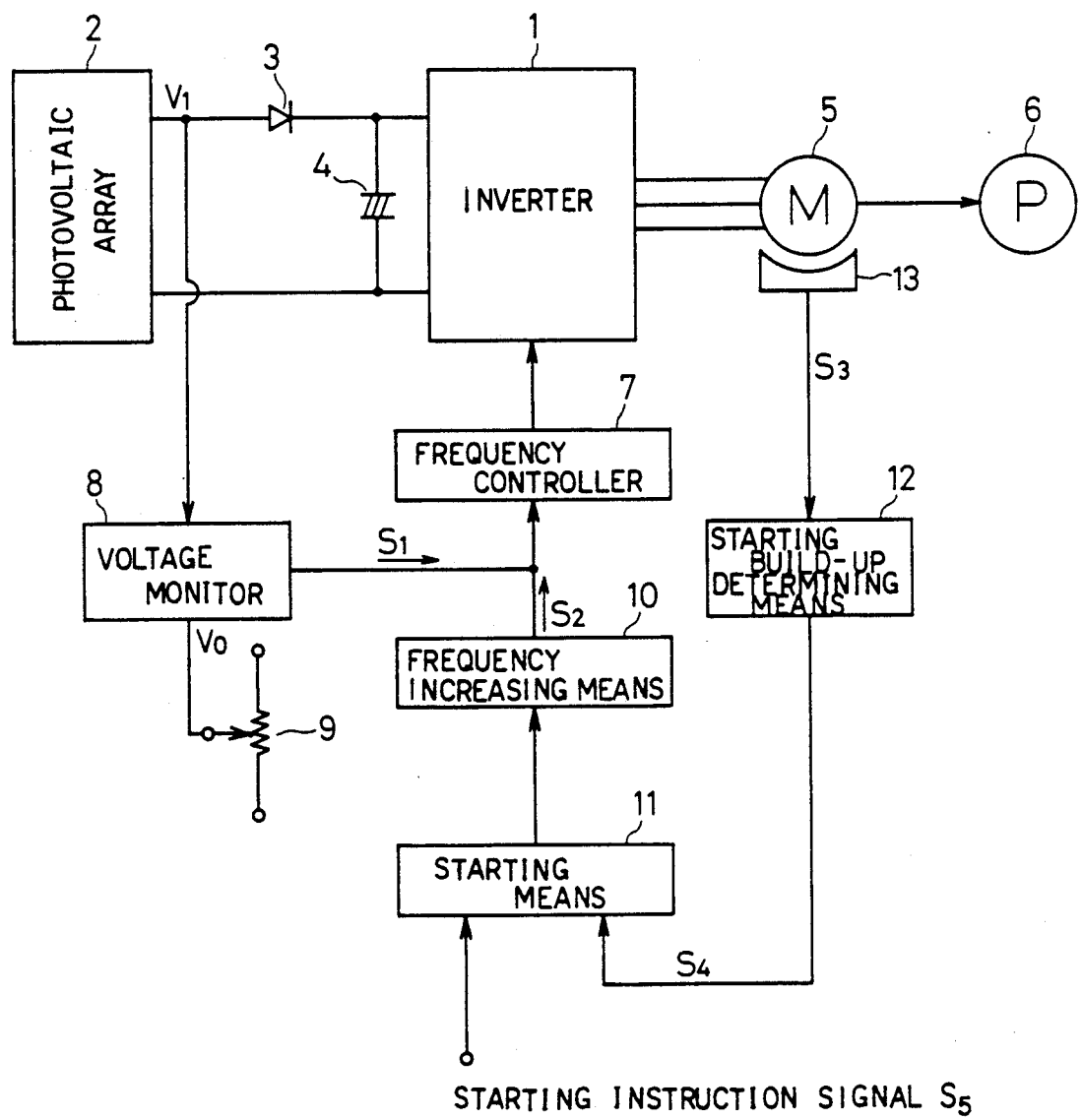
FIG. 1 is a block diagram of a first embodiment of the electric motor running system employing a photovoltaic array in accordance with this invention.
Figure 2:
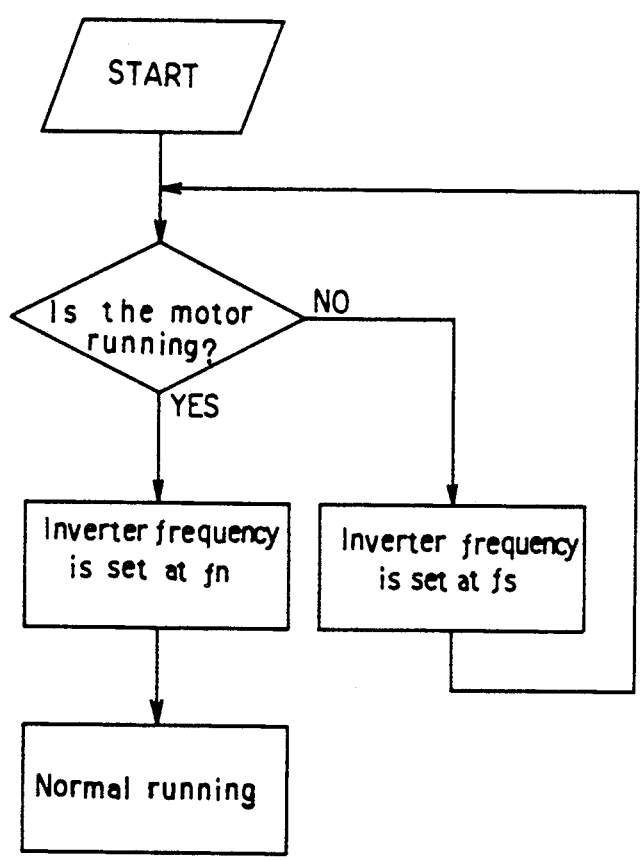
FIG. 2 is a flow chart showing the operation of the system in FIG. 1.

First Embodiments (See FIGS. 1–3)

Figure 14:
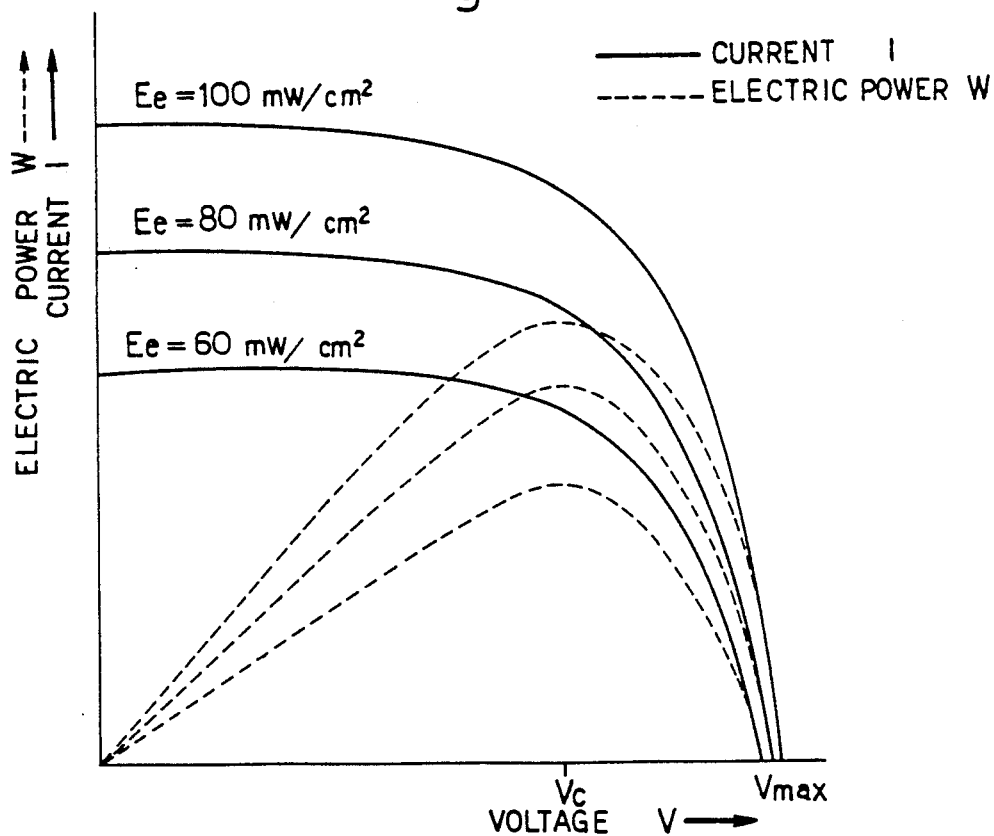
FIG. 14 is a graph showing a relationship of the current and the output power for the voltage in the photovoltaic array.

An output voltage of a photovoltaic array 2 is supplied to an inverter 1 to be inverted to AC voltage through a reverse current preventive diode 3 and a smoothing capacitor 4. An induction motor 5 is adapted to be activated by application of the AC voltage supplied from the inverter 1 to thereby drive a load 6 such as a pump, fan or the like. The frequency of the inverter 1 is controlled by a frequency controller 7 with the output voltage and frequency thereof maintained in a functional relation. A voltage monitor 8 compares the output voltage $V_1$ of the photovoltaic array 2 with a reference voltage $V_0$ set in a setting means 9 to thereby produce a frequency regulation signal $S_1$ in response with the deviation therebetween. The signal $S_1$ is supplied to the frequency controller 7, which controls the output frequency of the inverter 1 in a feedback manner so that the output voltage of the photovoltaic array 2 is maintained at a constant value Vc or the reference value Vo as shown in FIG. 14.

In other words, the frequency controller 7 is arranged to control a switching frequency and a duty factor of a switching element constituting the inverter 1 in accordance with the frequency regulation signal so that the output frequency and output voltage of the inverter 1 are varied with the ratio of the output voltage of the inverter 1 to the output frequency thereof maintained at the constant value, as, for example, in an inverter disclosed by Frederick A. Stich in U.S. Pat. No. 3,971,972.

Since the above-described construction is well known in the art, the description will not go further.

The electric motor running system employing a photovoltaic array in accordance with this invention further comprises a means 10 for increasing the frequency, a starting means 11 and a means 12 for detecting the establishment of the starting of the motor 5. The frequency increasing means 10 is turned between the operative state and the non-operative state by the starting means 11. When the means 10 is in the operative state, it supplies the frequency controller 7 with a frequency increasing instruction signal $S_2$, thereby increasing the output frequency of the inverter 1 to the value fs which is larger than a value fn (see FIG. 3). In this case, the value fn corresponds to the normal running frequency necessary for the motor 5 to produce a normal running torque Tn so that the output voltage $V_1$ of the photovoltaic array 2 is maintained at the value Vc or that the load 6 is kept driving normally. The value fs corresponds to the frequency necessary for the motor 5 to produce a larger starting torque than the normal running torque Tn, that is, in this embodiment, the frequency necessary for the motor 5 to produce a larger torque Ts than the static friction torque Tp of the positive displacement pump as the load 6. The means 12 is provided with a detector 13 which detects the revolution of the motor 5 to thereby supply the means 12 with a speed signal $S_3$. When supplied with the speed signal $S_3$, the means 12 determines that the motor 5 has built up a predetermined revolution that is, the build-up of the starting of the motor 5, thereby supplying the starting means 11 with a starting build-up signal $S_4$.

Starting operation of the motor 5 will be described with reference to FIGS. 2 and 3. FIG. 3(a) shows the changing of the output frequency of the inverter 1. FIG. 3(b) shows the changing of the torque of the motor 5 in accordance with the output frequency of the inverter 1. When the starting means 11 is supplied with a starting instruction signal $S_5$ at the time $t_0$ by a manually operated switch (not shown) as shown in FIG. 3 so that the motor 5 may be initially started, the inverter 1 is activated in a well-known manner. Simultaneously, the frequency increasing means 10 is turned from the non-operative state to the operative state as intended by the invention, whereby the inverter 1 is controlled by the frequency controller 7 which is supplied with the frequency increasing instruction signal $S_2$ from the frequency increasing means 10, so that the output frequency of the inverter 1 is instantaneously increased to the value fs which is larger than the value fn. The motor 5 is started when the output frequency of the inverter 1 takes the value fs which is larger the value fn. When the starting means 11 is supplied with the signal $S_4$ from the means 12, the frequency increasing means 10 is turned from the operative state to the non-operative state by the starting means 11, whereby the inverter 1 is controlled so that the output frequency thereof may be gradually decreased to the normal running frequency fn. FIG. 2 is a flow chart illustrating the above-described operation.

Since the motor 5 produces a larger starting torque Ts than the load starting torque Tp while the motor 5 is being started for the period of time $t_0$–$t_1$, the motor 5 can be started smoothly even where the load 6 is a positive displacement pump having a large static friction torque. The electric motor running system of the first embodiment does not require the photovoltaic array 2 to have a large capacity for compensation of the starting of the motor, thereby providing a small-sized and low cost system.

Generally, a domestic well water system employs a photovoltaic array as a power supply source. In the case where a well is deep, a positive displacement pump is employed. In the positive displacement pump, a head of fluid scarcely changes though the rotation of the motor changes with changes of the solar insolation degree. The positive displacement pump, however, has larger static friction torque than the centrifugal pump. In order that the starting torque of the motor may be increased, the capacity of the motor needs increasing. Such a problem is solved by the invention described herein.

Figure 4:
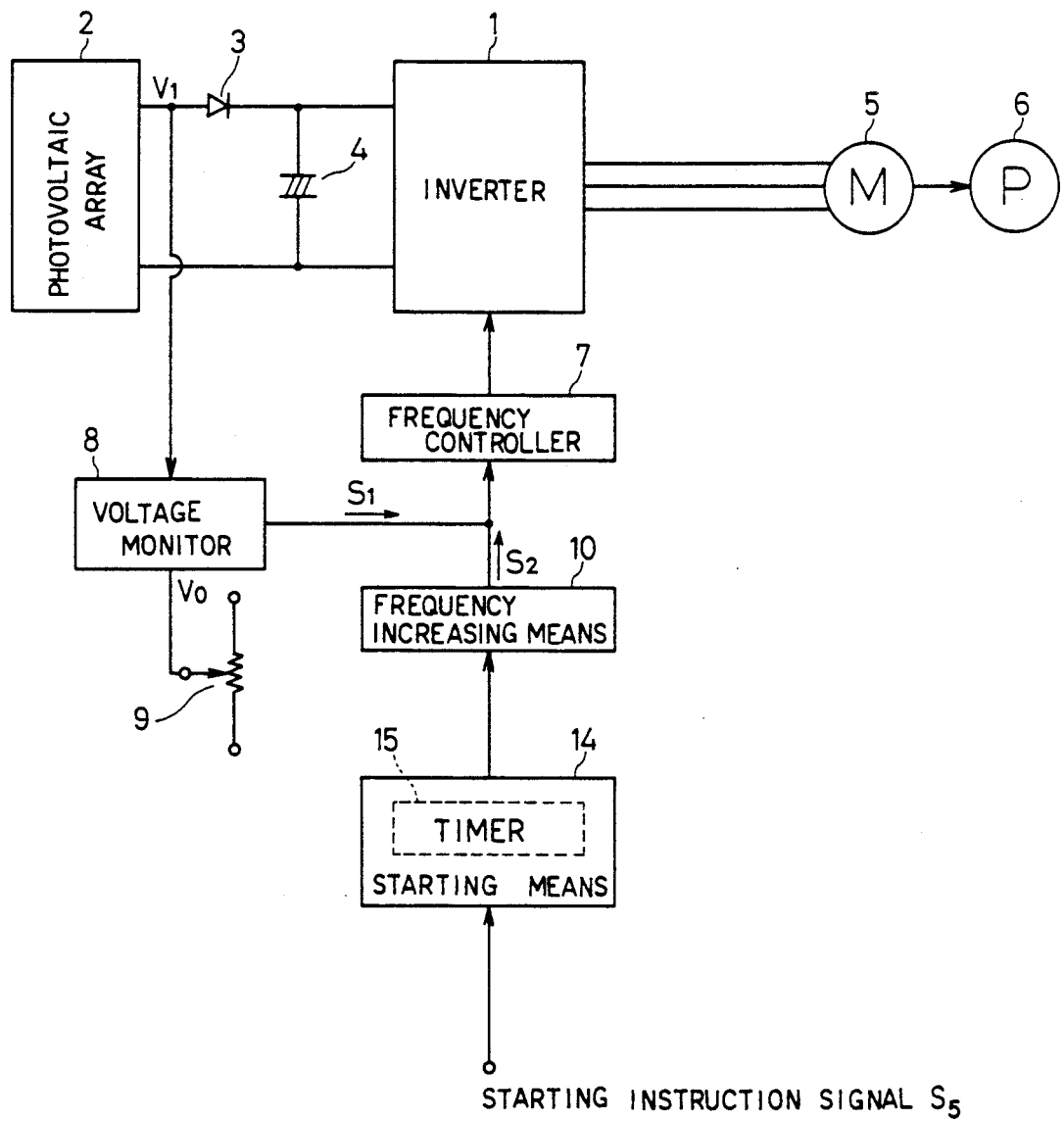
FIG. 4 is a block diagram of a second embodiment of the electric motor running system employing a photovoltaic array.

Second Embodiment (See FIG. 4)

In an electric motor running system of the second embodiment shown in FIG. 4, the means 12 for detecting the establishment of the starting of the motor and the speed detector 13 are removed, and the starting means 14 is provided with a timer 15 in place. Other arrangements are the same as those shown in FIG. 1.

When the starting means 14 is supplied with a starting instruction signal $S_5$, the timer 15 starts the timing operation. The frequency increasing means 10 is held at the operative state for a predetermined period of time set in the timer 15 which is approximately equal to the period of time $t_0$–$t_1$ in FIG. 3. Consequently, the motor 5 is started in the condition where the output frequency of the inverter 1 takes the value fs.

Figure 5:
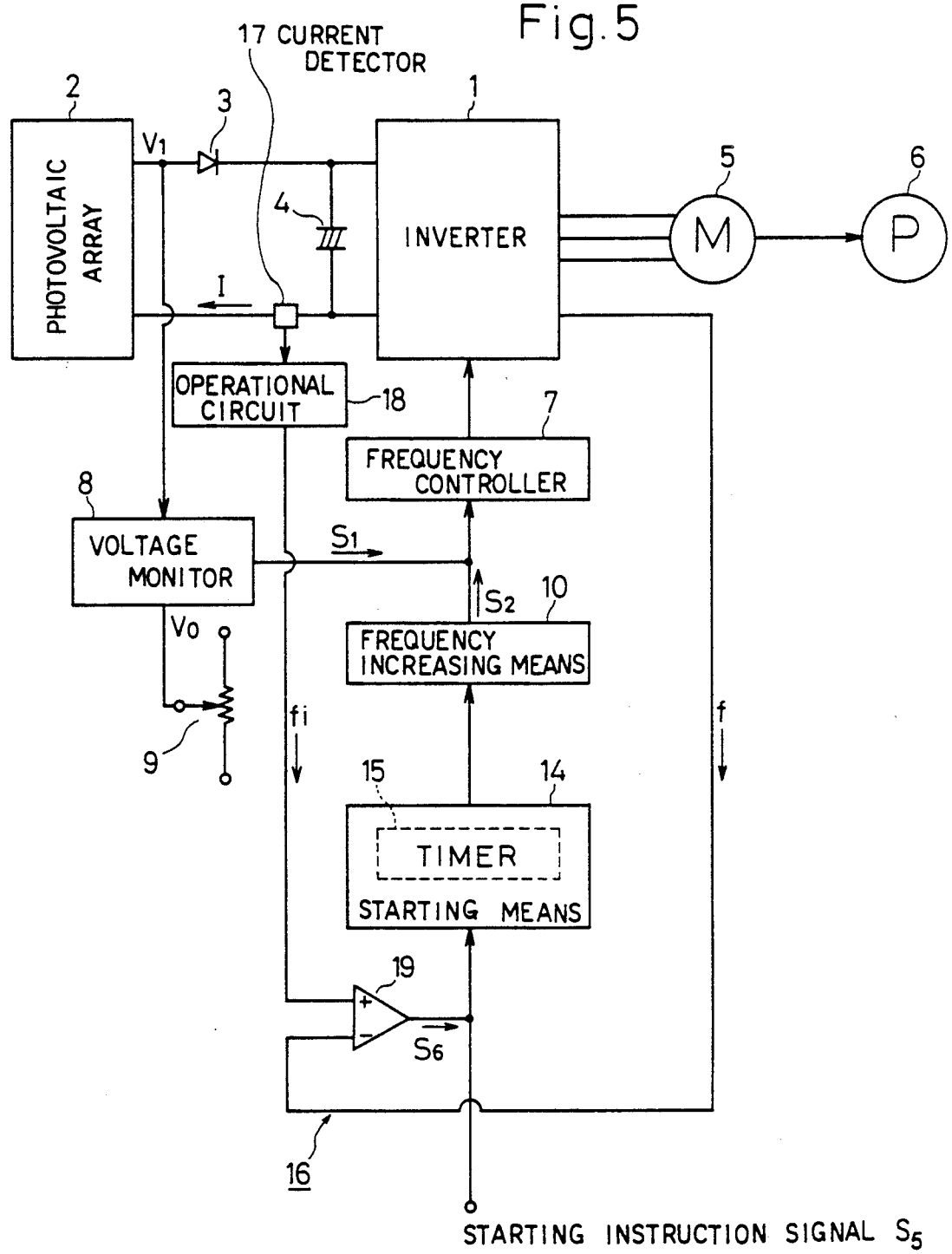
FIG. 5 is a block diagram of a third embodiment of the electric motor running system employing a photovoltaic array.
Figure 6:
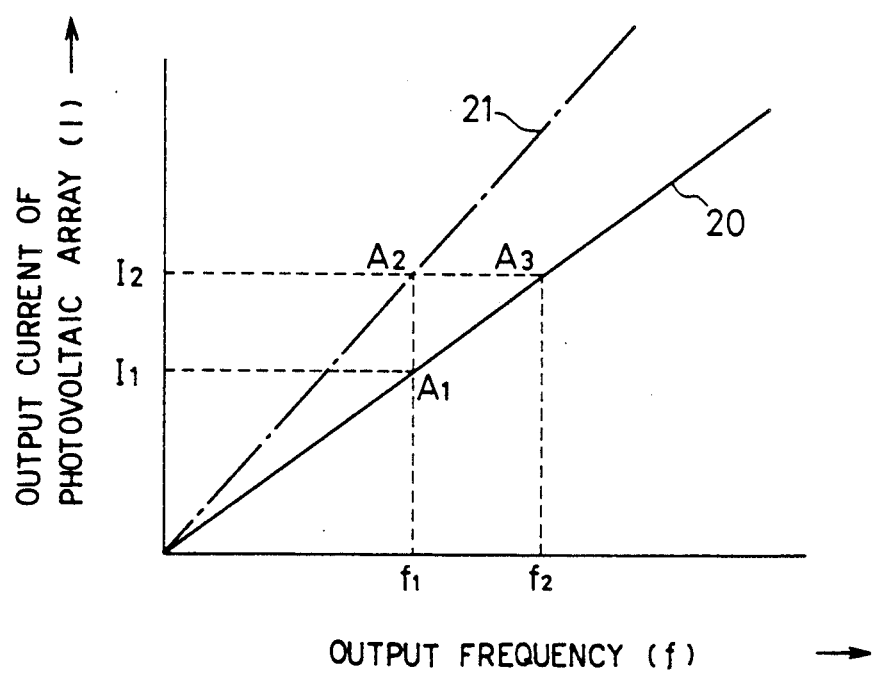
FIG. 6 is a graph showing a relationship between the output frequency of the inverter employed in the system in FIG. 5 and the output current of the photovoltaic array.

Third Embodiment (See FIGS. 5 and 6)

In an electric motor running system shown in FIG. 5 as a third embodiment, the motor 5 is automatically restarted in the case where it is led into a locked-rotor condition due to a temporally overload or the like. A means 16 for detecting the locked-rotor condition of the motor 5 is added to the construction shown in FIG. 4. The means 16 comprises a current detector 17 for detecting the output current of the photovoltaic array 2, that is, the load current I, an operation circuit 18 converting the load current I detected by the current detector 17 into the corresponding value of frequency, and a frequency comparator 19 comparing the output frequency f of the inverter 1 with a reference frequency fi supplied from the operational circuit 18.

A straight line 20 in FIG. 6 shows running characteristics of the motor 5 in the case where the motor is not in the locked-rotor condition, and a straight line 21 shows running characteristics of the motor in the locked-rotor condition.

In the system shown in FIG. 5, the motor 5 is initially started in the same manner as in the case of the system shown in FIG. 4. The output current of the photovoltaic array 2, that is, the load current I is proportional to the output frequency f of the inverter 1 during the running of the motor 5, as shown in FIG. 6. This shows that an amount of load is controlled by controlling the output frequency f of the inverter 1 with the ratio V/f maintained at a constant value so that the output voltage of the photovoltaic array 2 may be maintained at a constant value in spite that the solar insolation degree varies.

Referring to FIG. 6, when the motor 5 runs normally under the condition of $f=f_1$, the operating point is denoted by point $A_1$ and the load current I takes the value $I_1$. Accordingly, the reference fequency fi supplied from the operational circuit 18 is shown as $k_1 \times I_1 = f_1$ (where $k_1$=conversion constant). On the other hand, when the motor 5 is in the locked-rotor condition under the frequency $f_1$ due to temporary overload or the like in the midst of the running, the operating point is changed from point $A_1$ to point $A_2$ and the amount of load is increased to the value $I_2$. Consequently, the reference frequency fi supplied from the operational circuit 18 is shown as $k_1 \times I_2 = f_2$.

The reference frequency fi described above is compared with the actural output frequency f of the inverter 1 by the frequency comparator 19. In every case except fi=$f_1$, that is, in the case of fi=$f_2$, the value $f_2$ does not agree with the output frequency f, so that the starting means 14 is supplied with a locked-rotor condition detection signal $S_6$ from the frequency comparator 19. The motor 5 is restarted in the same manner as in the second embodiment under the condition where the output frequency of the inverter 1 takes the value fs.

Figure 7:
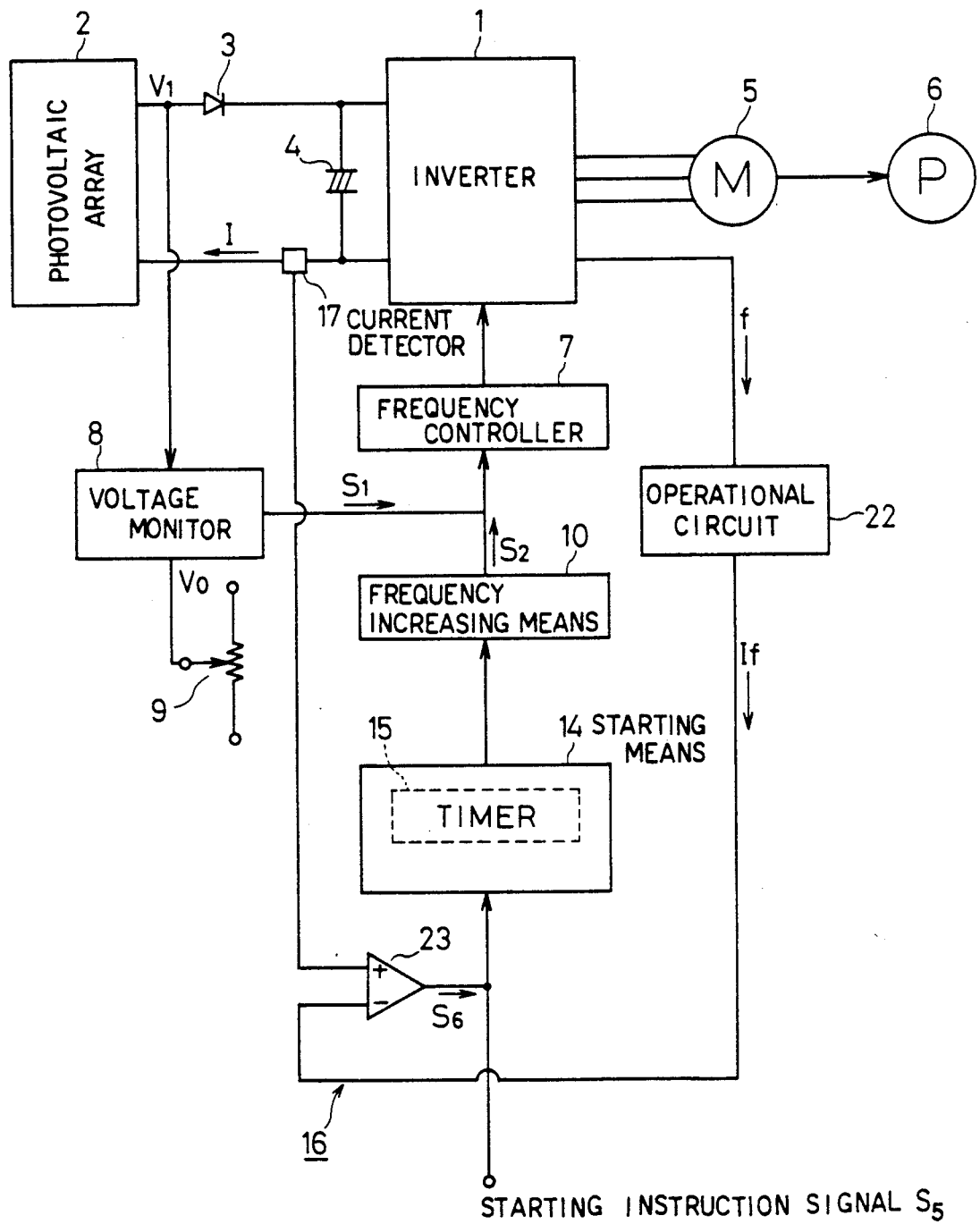
FIG. 7 is a block diagram of a fourth embodiment of the electric motor running system employing a photovoltaic array.

Fourth Embodiment (See FIG. 7)

In a system of the fourth embodiment, the output frequency f of the inverter 1 is converted to a current value if in accordance with the running characteristics line 20 in FIG. 6 by an operational circuit 22. The current value If is compared with the load current I detected by the current detector 17 by a current comparator 23. When the current value If does not agree with the load current I, the means 14 determines that the motor 5 is in the locked-rotor condition. The system is hereafter operated in the same manner as that in the case of the system in FIG. 5.

In each electric motor running system in FIGS. 5 and 7, a means for restarting the motor 5 comprises the starting means, respective comparators 19 and 23 from each of which the starting means 14 is supplied with the signal $S_6$, and the frequency increasing means 10 which is turned to the operative state by starting means 14.

Figure 8:
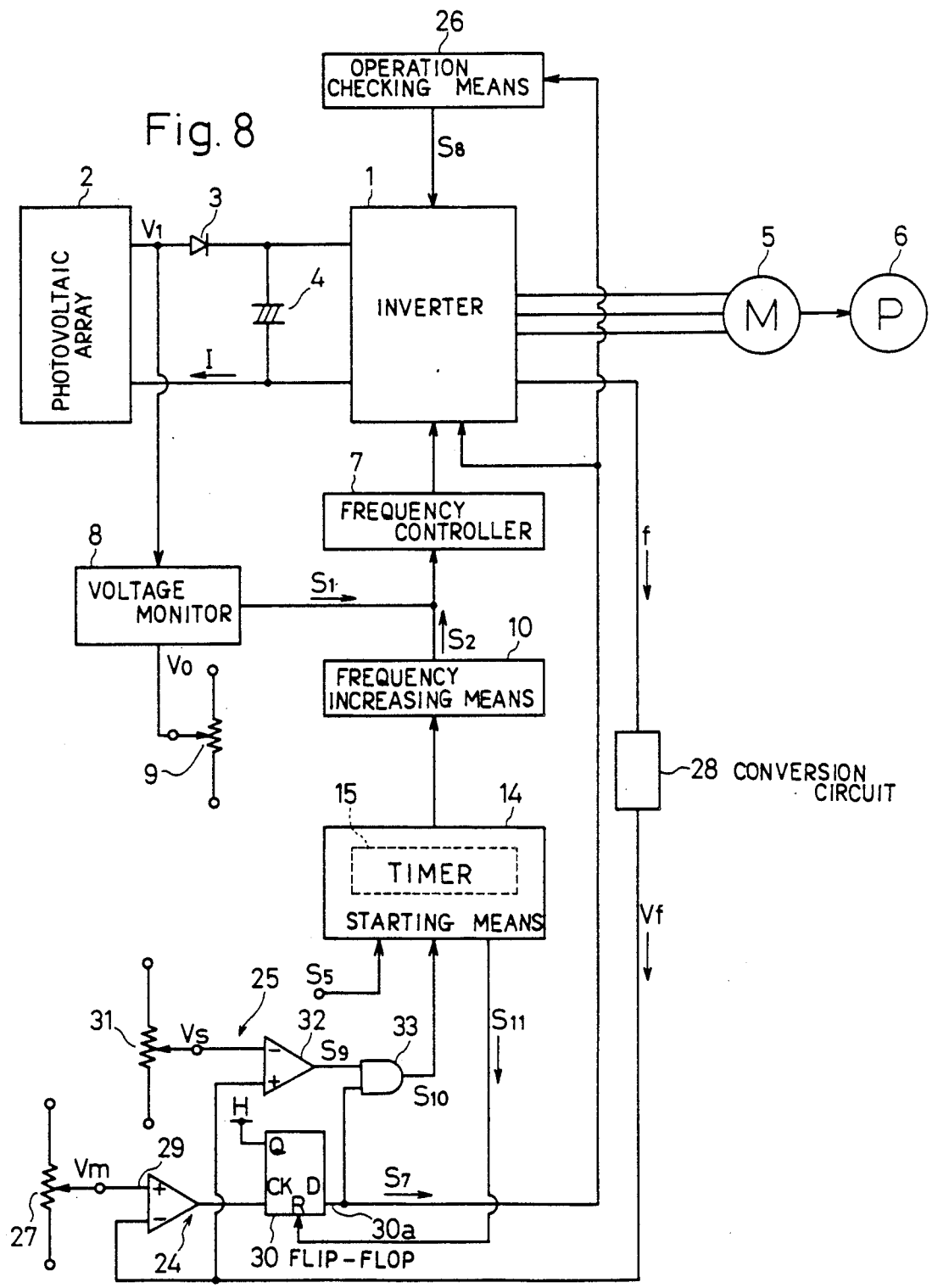
FIG. 8 is a block diagram of a fifth embodiment of the electric motor running system employing a photovoltaic array.
Figure 9:
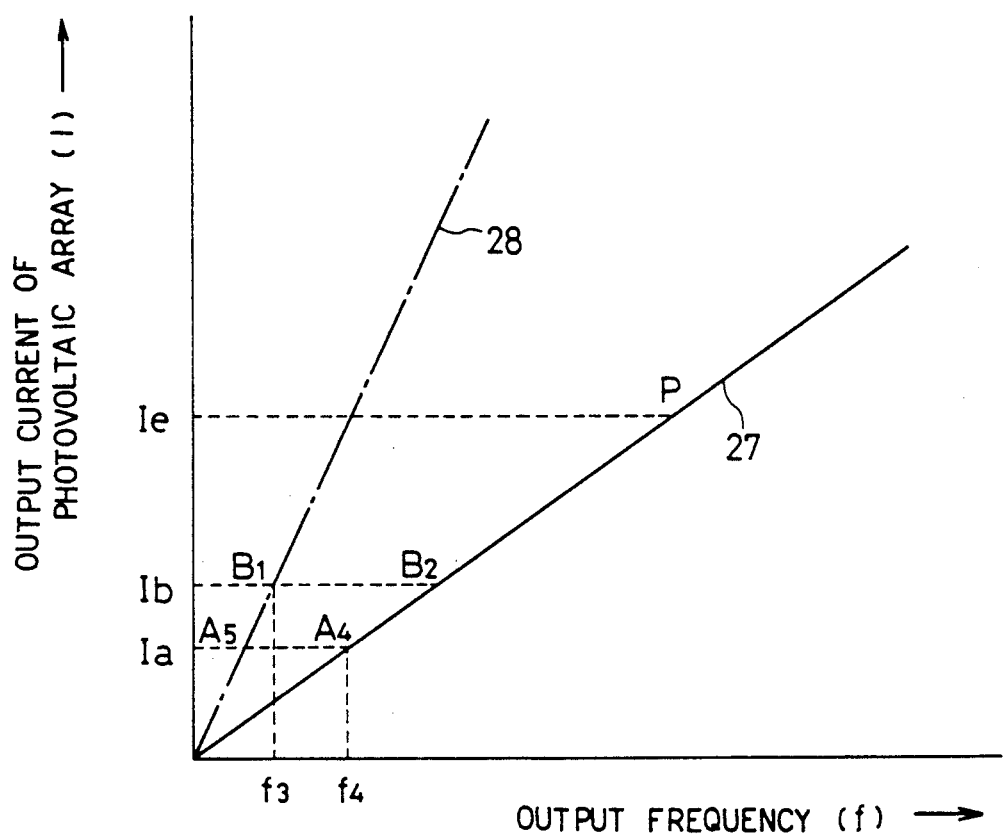
FIG. 9 is a graph showing a relationship between the output current of the inverter employed in the system in FIG. 8 and the output current of the photovoltaic array.
Figure 10:
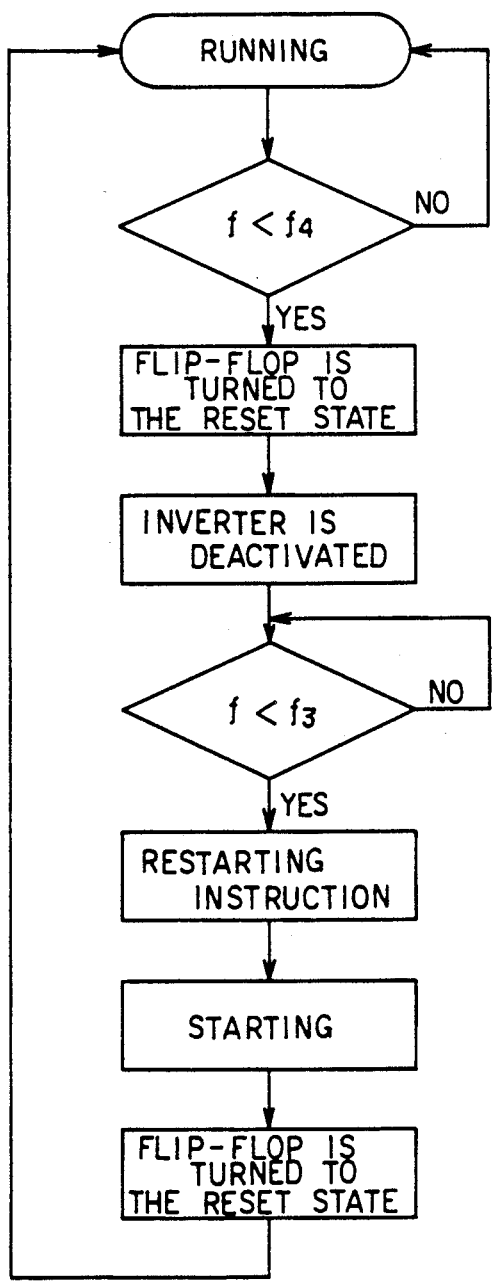
FIG. 10 is a flow chart illustrating the operation of the system in FIG. 8.

Fifth Embodiment (See FIGS. 8–10)

In a system of the fifth embodiment, the inverter 1 is deactivated when the output of the photovolatic array 2 is decreased such that effective drive of the load cannot be maintained or that the motor 5 is in the locked-rotor condition. The load is redriven when the output of the photovoltaic array 2 is recovered.

The system of the fifth embodiment shown in FIG. 8 has arrangements in which a means 24 for deactivating the inverter 1, a means 25 for detecting the recovery of the power supply source and an operation checking means 26 are added to the arrangements of the system shown in FIG. 4.

FIG. 9 shows a relationship between the output frequency f of the inverter 1 and the output current I of the photovoltaic array 2, that is, the load current. A straight line 27 in FIG. 9 denotes running characteristics of the motor where it is not in the locked-rotor condition and a straight line 28 running characteristics of the motor in the locked-rotor condition.

The electric motor running system of the fifth embodiment will be described with reference to FIG. 9. Assume that the motor runs normally with point P as the operating point (where Ie=load current). In this case, if the solar insolation degree is gradually decreased, the output frequency of the inverter 1 is also decreased. When the output frequency $f_4$, the revolution of the motor 5 is decreased such that the load is not effectively driven or that the motor 5 is substantially in the locked-rotor condition. In this case, the operating point takes point $A_4$. When the motor 5 is in the locked-rotor condition, the operating point is changed to point $A_5$. Symbol $f_3$ denotes the minimum starting frequency. The operating point takes point $B_1$ when the motor 5 is started under the minimum starting frequency $f_3$ (the operating point changes to point $B_2$ immediately after the starting of the motor 5), so that the load current I which is able to be supplied is increased from the value Ia corresponding to the minimum operative frequency $f_4$ to the value Ib corresponding to the minimum starting frequency $f_3$. Accordingly, the motor 5 can be supplied with a starting current value of which is larger than the minimum operative load current Ia.

In the system shown in FIG. 8, the inverter deactivating means 24 comprises a setting means 27 which sets a deactivating reference voltage Vm corresponding to the minimum operative frequency $f_4$. The deactivating reference voltage Vm is compared by a comparator circuit 29 with the voltage Vf gained by converting the output frequency f supplied from the inverter 1 at a converting circuit 28. The output frequency f of the inverter 1 is decreased to the value $f_4$ with gradual decrease of the solar insolation degree. Consequently, when the voltage Vf drops below the reference voltage Vm, the comparator circuit 29 produces a high-level output signal, which is supplied to a flip-flop 30. In order to memorize that the motor 5 has fallen in the locked-rotor condition or the like, the flip-flop 30 is turned to the set state to thereby produce a deactivation signal $S_7$, which is supplied to a line 30a. The inverter 1 is deactivated when receiving the deactivation signal $S_7$ and the operation checking means 26 is activated simultaneously. The operation cheking means 26 supplies the inverter 1 with operation instruction signals $S_8$ at predetermined intervals, whereby the inverter 1 is deactivated for short period of time every time when supplied with the operation instruction signal $S_8$ from the operation checking means 26. Thus the inverter 1 supplies the converting circuit 28 with the output frequency f in accordance with the solar insolation degree at every time when activated. The inverted voltage Vf is supplied to a power supply source recovery detecting means 25.

The power supply source recovery detecting means 25 comprises a setting means 31 for setting the starting reference voltage Vs which corresponds with the starting minimum frequency $f_3$. The reference Vs is compared by the comparator circuit 32 with the voltagre Vf produced at the predetermined intervals due to the checking operation of the means 26. When the solar insolation degree is recovered such that the motor 5 is restarted, the voltage Vf is increased to the value above the reference voltage Vs, so that the comparator circuit 32 produces a high-level signal $S_9$. Thus, since both of the input signals $S_7$ and $S_9$ to an AND gate 33 are at high level, the AND gate produces a restarting signal $S_{10}$, which is supplied to the starting means 14. The starting means 14 supplies the flip-flop 30 with a reset signal $S_{11}$ when supplied with the restarting signal $S_{10}$. The flip-flop 30 is reset and simultaneously the frequency increasing means 10 is activated for a predetermined period of time set in the timer 15. The inverter 1 is thus restarted. FIG. 10 is a flow chart illustrating the above-described operation.

Figure 11:
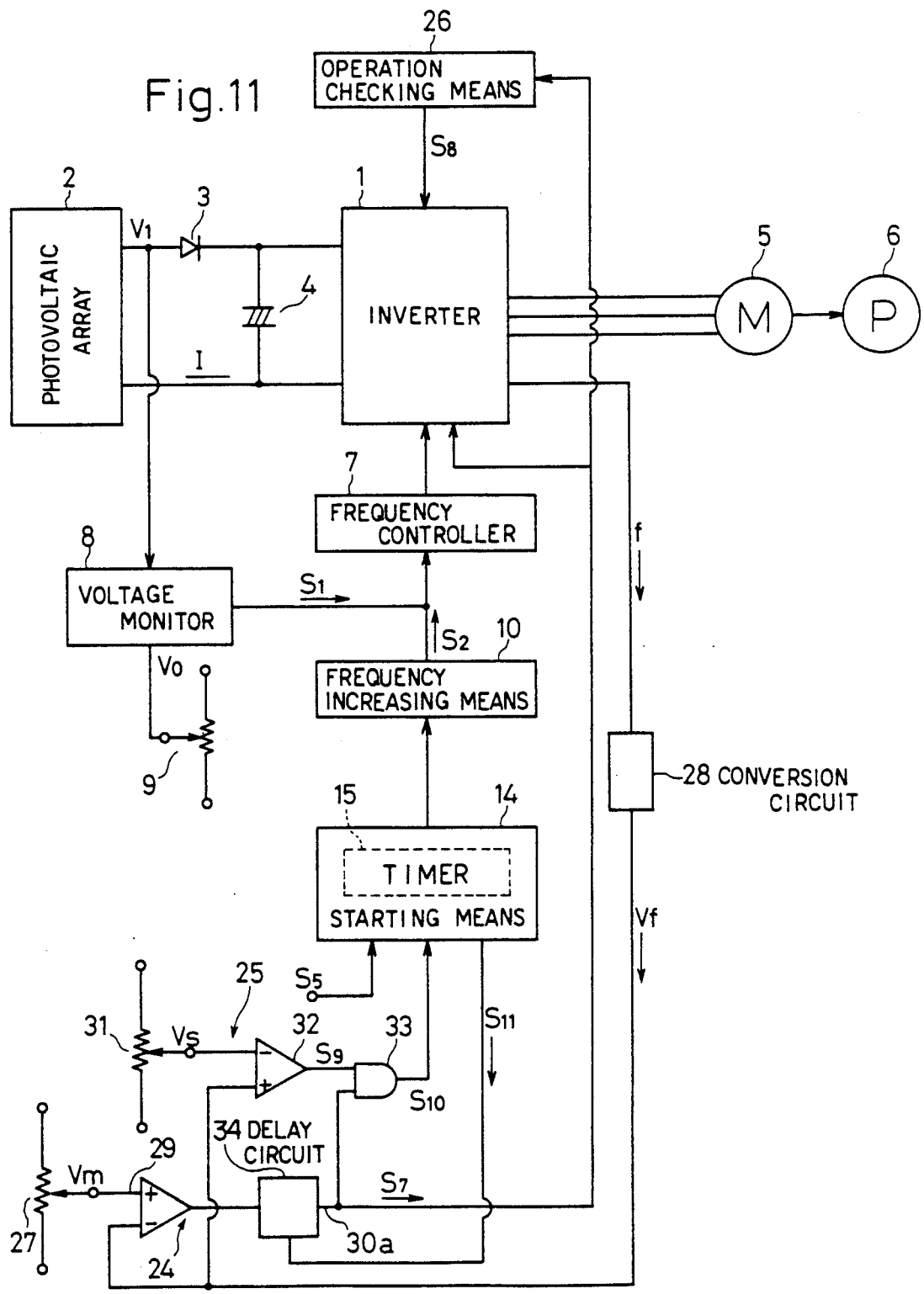
FIG. 11 is a block diagram of a sixth embodiment of the electric motor running system employing a photovoltaic array.

Sixth Embodiment (See FIG. 11)

FIG. 11 shows a sixth embodiment. In the sixth embodiment, the flip-flop 30 in FIG. 8 is replaced by a delay circuit 34. Delay time set in the delay circuit 34 is adapted to agree with a conjectured period of time required for the output frequency of the inverter 1 to change from the value f₄ to the value f₃ shown in FIG. 9. The delay circuit 34 keeps memorizing that the motor 5 has fallen in the locked-rotor condition and supplying the line 30a with a deactivation signal S. The other operation is the same as that described with reference to FIG. 8.

Figure 12:
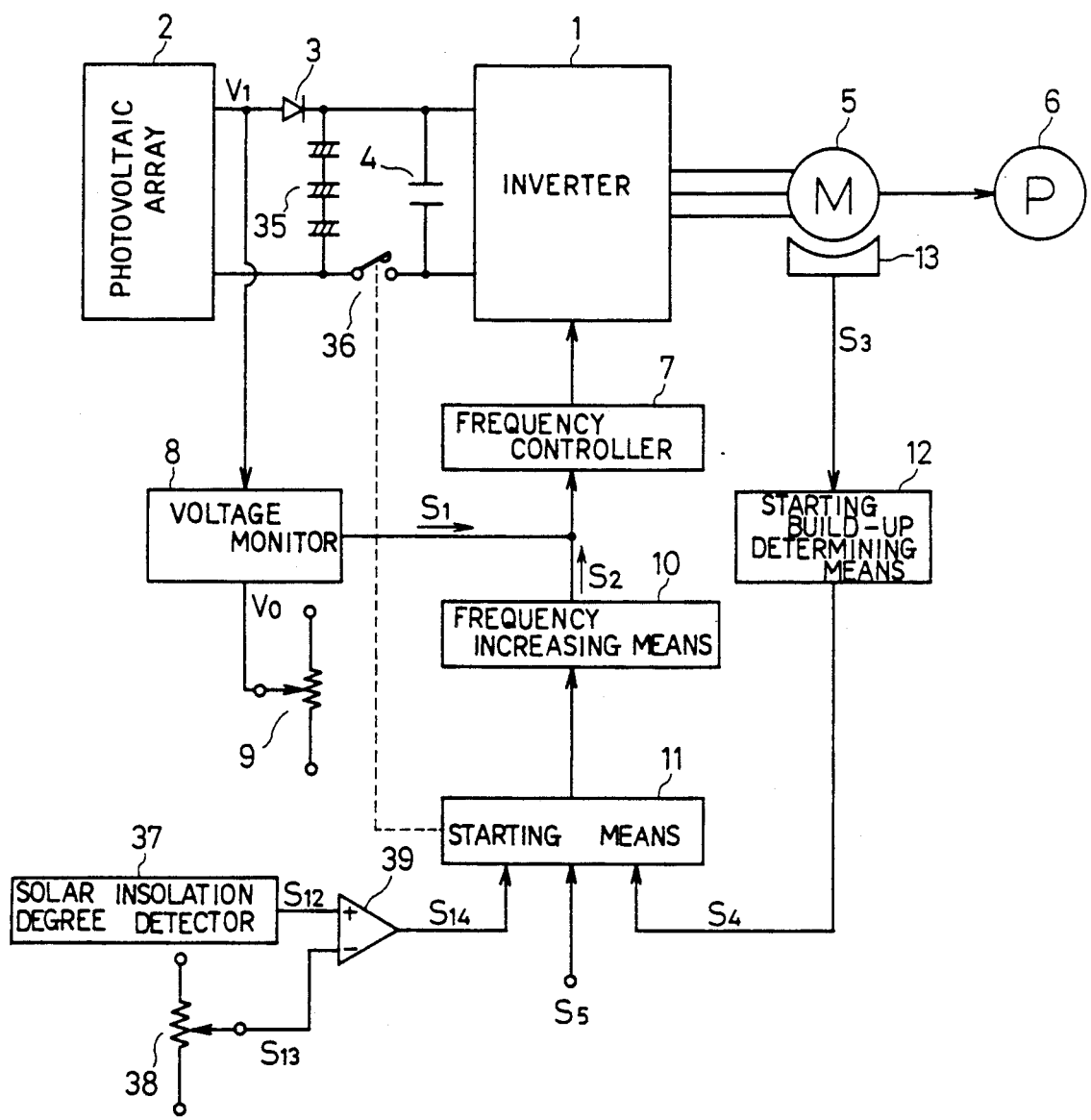
FIG. 12 is a block diagram of a seventh embodiment of the electric motor running system employing a photovoltaic array.
Figure 13:
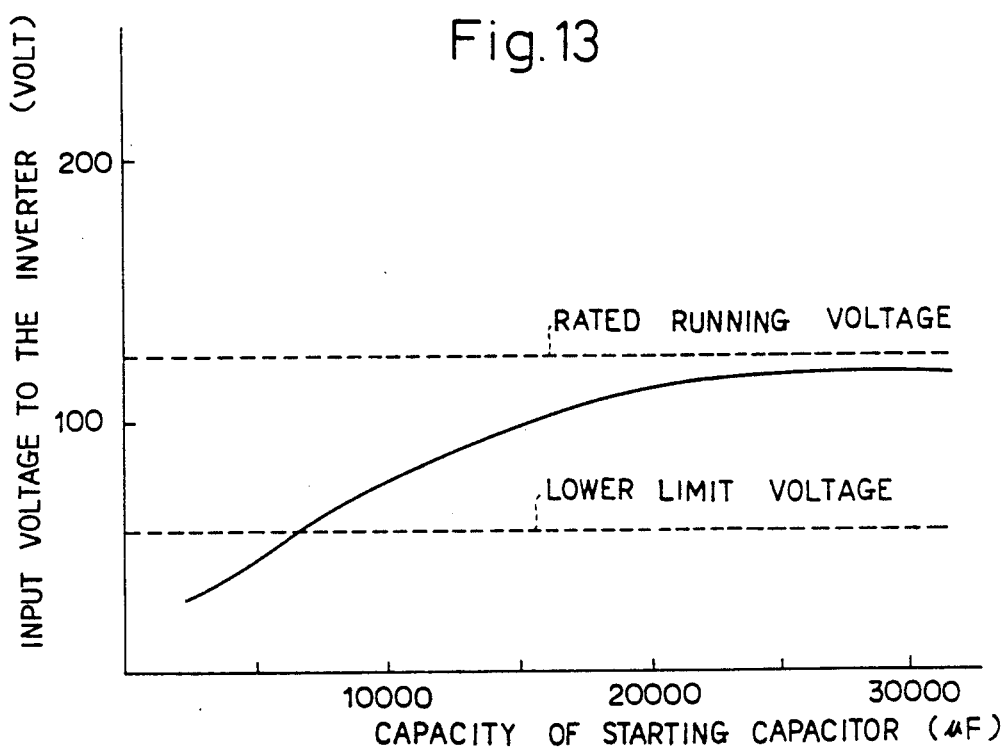
FIG. 13 is a graph showing a relationship between the capacity of a starting capacitor employed in the system in FIG. 12 and the input voltage of the inverter.

Seventh Embodiment (See FIGS. 12 and 13)

FIG. 12 shows a seventh embodiment. When the motor 5 is started under a relatively low solar insolation degree, the input voltage of the inverter 1 extremely drops temporally due to a large amount of starting current. In this case, the motor cannot be started. Furthermore, the voltage drop causes the control circuit of the inverter 1 to lead an error. This embodiment is directed to the solution of such inconvenience.

In the arrangements in FIG. 12, portions different from those in FIG. 1 will be described. A starting capacitor 35 having a large capacity as an electrical power storage means is connected to the output of the photovoltaic array 2 so as to be normally charged through the diode 3 together with the output voltage of the photovoltaic array 2. The voltage charged at the capacitor 35 is adapted to be applied to the input of the inverter 1 through a main switch 36 together with the output voltage of the photovoltaic array 2.

A solar insolation degree detector 37 produces a detection signal $S_{12}$ corresponding to the solar insolation degree to the photovoltaic array 2. The detection signal $S_{12}$ is compared by a comparator 39 with a solar insolation degree signal $S_{13}$ set by a solar insolation degree setting means 38. In this case, if the main switch 36 is turned off due to the low level of the solar insolation degree, the inverter 1 is deactivated, so that the output energy from the photovoltaic array 2 is charged and stored in the starting capacitor 35.

Where the magnitude of the detection signal $S_{12}$ is increased above that of the solar insolation degree signal $S_{13}$ with increase of the solar insolation degree in the above-mentioned state of condition, the comparator 39 supplies the starting means 11 with a starting instruction signal $S_{14}$. The main switch 36 is turned on by the means 11 and the frequency increasing means 10 is turned to the operative state simultaneously, whereby the motor 5 is started in the same manner as described in the first embodiment with the inverter 1 producing higher output frequency than the normal running frequency.

The electrical energy charged at the starting capacitor 35 discharged to the inverter 1 when the main switch 36 is turned on for the starting of the motor 5. Generally, when the output voltage of the inverter is increased by temporally increasing the output frequency of the inverter in the starting of the motor, the input voltage to the inverter excessively drops temporally to the value at which the motor cannot be started. In this embodiment, however, such inconvenience is prevented by the electrical energy discharged from the starting capacitor 35.

The construction described above is of great advantage to the positive displacement pump which has a large static friction torque. In the electric motor running system of this embodiment, the photovoltaic array 2 has a capacity of 1300 Wp and the motor 5 has a capacity of 750 W. The static friction torque of the pump as the load 6 is 0.6 kg·m.

In order to determine a preferable static capacity of the starting capacitor 35 in the system of this embodiment, the inventors has made an experiment in which the capacity of the capacitor 35 is successively changed in the range from 1,500 μF to 30,000 μF under the condition where the solar insolation degree is 30 mW/cm². FIG. 13 shows the values of input voltage to the inverter 1 in the case where the motor 5 is restarted with the capacity of the capacitor 35 taking each capacity value.

According to FIG. 13, the rate at which the input voltage to the inverter 1 drops is accelerated with reduction of the capacity of the capacitor 35, so that the voltage necessary for the control circuit of the inverter 1 cannot be ensured. FIG. 13 also shows that the voltage drop rate almost never changes even if the capacity of the capacitor 35 is increased above the maximum value needed. Consequently, it is concluded, from FIG. 13, that the preferable static capacity C is limited in a range from 7,000 μF to 20,000 μF.

Although the capacity C of the capacitor 35 is selected so that it falls in the range from 7,000 μF to 20,000 μF in this embodiment, the most preferable value of the capacity of the starting capacitor may be changed in accordance with the values of the static friction torque of the pump or the power supply source voltage. In this case, the electrical energy Ec stored at the starting capacitor 35 and the electrical energy Ep necessary for the pump to be driven are denoted by the following expressions respectively:

$$Ec = \tfrac{1}{2}CV^2$$

$$Ep = 2\pi Tp \cdot 9.8$$

where
C = capacity of the starting capacitor
V = initially set power source line voltage
Tp = static friction torque of the pump, that is, starting torque Since it may be regarded that an amount of electrical energy necessary for starting the pump is proportional to an amount of electrical energy stored at the starting capacitor, the value of the ratio Ec/Ep is considered not to vary with change of the voltage V or the torque Tp. Accordingly, the ratio Ec/Ep is shown by the following expression when the starting capacitor 35 takes the most preferable value of the capacity thereof:

$$1.5 \leq Ec/Ep \leq 6$$

If the capacity of the starting capacitor 35 is determined so as to satisfy the above expression, the capacitor 35 may be applied to the pumps which have different static friction torques or the electric motor running system which have different values of power supply source voltage.

The foregoing disclosure and drawings are merely illustrative of the principles of this invention and are not to be interpreted in a limiting sense. The only limitation is to be determined from the scope of the appended claims.

What is claimed is:

1. In an electric motor running system including a photovoltaic array, an inverter for inverting an output voltage of the photovoltaic array to an AC voltage, an induction motor supplied with the AC voltage from the inverter, said induction motor being provided for driving a load requiring a starting torque larger than a normal running torque, a voltage monitor for detecting the output voltage of the photovoltaic array and comparing the output voltage of the photovoltaic array with a reference voltage, the value of which approximately corresponds to a peak power point of the photovoltaic array, to thereby generate a frequency regulation signal in accordance with a deviation between the output voltage of the photovoltaic array and the reference voltage, and a frequency controller for controlling the inverter in a feedback manner in response to the frequency regulation signal so that the inverter varies a normal running frequency thereat to maintain the output voltage of the photovoltaic array at the value of the reference voltage, and wherein an output voltage of the inverter is varied to maintain a ratio thereof to the normal running frequency thereof at a predetermined constant value, comprising:

a frequency generating means for generating a starting frequency and a starting voltage of the inverter when the inverter is started, the values of the starting frequency and starting voltage of the inverter being larger than those of respective normal running frequency and normal running voltage, said values being predetermined by the frequency controller operated in response to the frequency regulation signal, the values of the starting frequency and starting voltage being maintained at the same ratio therebetween as in the normal running of the inverter, and a starting means for causing said frequency generating means to operate for a predetermined period prior to the feedback control of the frequency controller at the time of starting the inverter and decreasing the output frequency and the output voltage of the inverter to the normal running frequency and the normal running voltage, respectively, under feedback control of the frequency controller when the predetermined period elapses.

2. An electric motor running system of claim 1, wherein said starting means includes a speed detector which detects revolution of the induction motor to maintain said frequency increasing means in an operative state while the revolution of the induction motor is increased from zero to a predetermined value.

3. An electric motor running system of claim 1, wherein said starting means includes a timer and wherein said starting means operates to hold said frequency increasing means in said operative state for a period set in said timer.

4. An electric motor running system of claim 1, which further comprises a starting energy storage means provided between the photovoltaic array and the inverter for storing an electric energy Ec from the photovoltaic array and supplying an input of the ivnerter with the electric energy when the inverter is started.

5. An electric motor running system of claim 4, wherein said starting energy storage means comprises a starting capacitor and wherein the electric energy Ec stored in said storage means and the electric energy Ep necessary to start a load have a relationship to satisfy the following expression:

$$1.5 \leq Ec/Ep \leq 6$$

where
$Ec = \frac{1}{2}CV^2$
$Ep = 2\pi Tp \cdot 9.8$

C = capacity of starting capacitor
V = voltage supplied initially when the motor is started
Tp = starting torque of the load.

6. An electric motor running system including a photovoltaic array, an inverter for inverting an output voltage of the photovoltaic array to an AC voltage, an induction motor supplied with the AC voltage from the inverter, said induction motor being provided for driving a load requiring a starting torque larger than a normal running torque, a voltage monitor for detecting the output voltage of the photovoltaic array and comparing the output voltage of the photovoltaic array with a reference voltage, the value of which approximately corresponds to a peak power point of the photovoltaic array, to thereby generate a frequency regulation signal in accordance with a deviation between the output voltage of the photovoltaic array and the reference voltage, and a frequency controller for controlling the inverter in a feedback manner in response to the frequency regulation signal so that the inverter varies a normal running frequency thereof to maintain the output voltage of the photovoltaic array at the value fo the reference voltage, and wherein the output voltage of the inverter is varied to maintain a ratio thereof to the normal running frequency thereof at a predetermined constant value, comprising:

a frequency generating means for generating a starting frequency and a starting voltage of the inverter when the inverter is started, the values of the starting frequency and starting voltage of the inverter being larger than those of respective normal running frequency and normal running voltage, said values being predetiminted by the frequency controller operated in response to the frequency regulation signal, the values of the starting frequency and starting voltage being maintained at the same ratio therebetween as in the normal running of the inverter, and a starting means for causing said frequency generating means to operate for a predetermined period period to the feedback control of the frequency controller at the time of starting the inverter and decreasing the output frequency and the output voltage of the inverter to the normal running frequency and the normal running voltage, respectively, under feedback control of the frequency controller when the predetermined period elapses.

said starting means including means for detecting a load current flowing in the induction motor and the output frequency of the inverter when the inverter is in the operative state, to thereby compare the detected values and determine that the induction motor is in a locked-rotor condition, and a restarting means for rendering said frequency increasing means operative for a predetermined period when supplied from said detecting means with a signal indicating that the induction motor is in the locked-rotor condition.

7. An electric motor running system including a photovoltaic array, an inverter for inverting an output voltage of the photovoltaic array to an AC voltage, an induction motor supplied with the AC voltage from the inverter, said induction motor being provided for driving a load requiring a starting torque larger than a normal running torque, a voltage monitor for detecting the output voltage of the photovoltaic array and comparing the output voltage of the photovoltaic array with a reference voltage, the value of which approximately corresponds to a peak power point of the photovoltaic array to thereby generate a frequency regulation signal in accordance with a deviation between the output voltage of the photovoltaic array and the reference voltage, and a frequency controller for controlling the inverter in a feedback manner in response to the frequency regulation signal so that the inverter varies a normal running frequency to maintain the output voltage of the photovoltaic array at the value of the reference voltage, and wherein the output voltage of the inverter is varied to maintain a ratio thereof to the normal running frequency thereof at a predetermined constant value, comprising:

a frequency generating means for generating a starting frequency and a starting voltage of the inverter when the inverter is started, the values of the starting frequency and starting voltage of the inverter being larger than those of respective normal running frequency and normal running voltage, said values being predetermined by the frequency controller operated in response to the frequency regulation signal, the values of the starting frequency and starting voltage being maintained at the same ratio therebetween as in the normal running of the inverter, and a starting means for causing said frequency generating means to operate for a predetermined period prior to the feedback control of the frequency controller at the time of starting the inverter and decreasing the output frequency and the output voltage of the inverter to the normal running frequency and the normal running voltage respectively, under feedback control of the frequency controller when the predetermined period elapses.

said starting means including means for deactivating the inverter when comparing the output frequency of the inverter with a minimum frequency necessary to effectively drive the load to thereby determine that the output frequency of the inverter has been decreased below the minimum frequency necessary to effectively drive the load, an operation checking means for momentarily activating the inverter at predetermined intervals while the inverter is deactivated, and a restarting means for activating the inverter with the reference frequency which has a smaller value than the minimum frequency necessary to effectively drive the load to thereby determined that the output frequency of the inverter has been recovered to the value above the reference frequency and simultaneously activating said frequency generating means for the predetermined period.

* * * * *